Sept. 16, 1941.    G. L. FOWLER    2,255,970
FASTENER ASSEMBLY
Filed June 27, 1939

Inventor:
George L. Fowler.
by John Todd
Att'y.

Patented Sept. 16, 1941

2,255,970

UNITED STATES PATENT OFFICE 2,255,970

FASTENER ASSEMBLY

George L. Fowler, Arlington, Mass., assignor to United-Carr Fastener Corporation, Cambridge, Mass., a corporation of Massachusetts Application June 27, 1939, Serial No. 281,400

6 Claims. (Cl. 24—208)

This invention relates to separable fastener assemblies and particularly to an assembly wherein a fastener member is secured on one side of a strip of supporting material and an ornamental part such as a leather button on the opposite side of the strip.

Referring to the drawing, in which I have illustrated a preferred embodiment of my invention:

Figure 1:
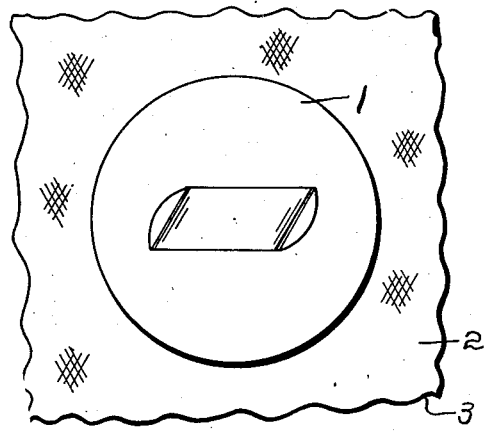
Fig. 1 is a top plan view of my preferred fastener assembly.
Figure 2:
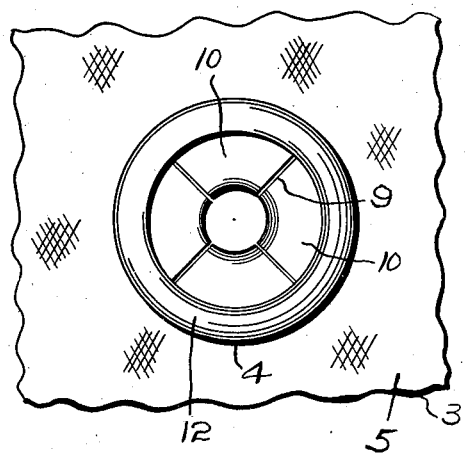
Fig. 2 is a bottom plan view of the assembly shown in Fig. 1 and showing a socket member as part of the assembly.
Figure 3:
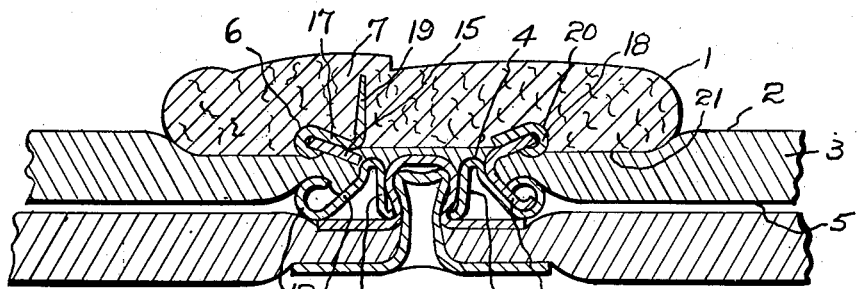
Fig. 3 is an enlarged sectional view of the assembly shown in Figs. 1 and 2 and showing a stud member secured to a supporting strip and engaged with the socket member.
Figure 4:
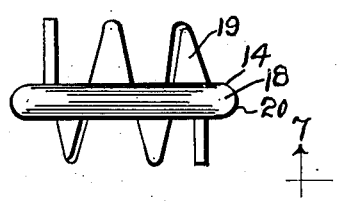
Fig. 4 is a side elevation of my improved attaching means.
Figure 5:
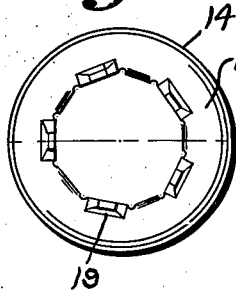
Fig. 5 is a top plan view of the attaching means shown in Fig. 4.
Figure 6:
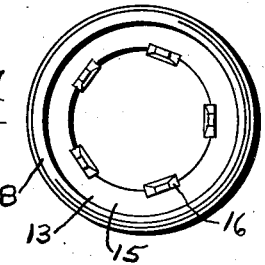
Fig. 6 is a bottom plan view of the attaching means shown in Fig. 4.

My preferred fastener assembly, as shown in Figs. 1, 2 and 3, comprises an ornamental part such as a button 1 secured on the upper side 2 of a supporting strip 3 and a fastener member 4, which may be either a stud or socket member, but which, in my preferred installation, is a socket member, secured to the lower side 5 of the supporting strip 3. An attaching means 6 (Fig. 3) comprising a part of the assembly provides attaching portions extending in opposite directions to engage with the button 1 and the socket member 4 through the strip 3 for securing the parts of the assembly together. The button 1, which is preferably of leather or the like, has a solid body portion 7 (Fig. 3) in which prong means of the attaching means 6 are embedded in assembly of the parts. The fastener member 4, which I have chosen to illustrate as a socket member, is preferably of a construction well known in the art and provides a central cylindrical wall 8 having slots 9 (Fig. 2) to form a number of resilient fingers 10. A downwardly sloping flange portion 11 is formed integral with the upper end of the cylindrical wall 8 and a U-shaped annular retainer portion 12 is provided at the outermost ends of the flange 11.

Figure 7:
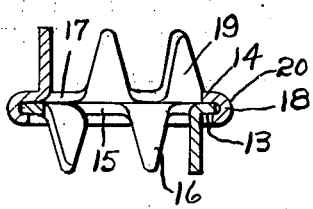
Fig. 7 is a sectional view taken along the line 7—7 of Fig. 5.

The attaching means 6 is preferably formed of two parts and comprises a ring member 13 and a ring-retainer member 14. The ring member 13 has a disk portion 15 in the form of a ring with a plurality of attaching portions in the form of tapered prongs 16 extending axially downwardly from the inner edge thereof. The ring-retainer member 14 has a disk portion 17 and a marginal wall 18 extending from the disk 17 whereby the disk 17 and wall 18 combine to form a cup-shaped portion for receiving the disk 15, after which the wall 18 is clamped over the disk to secure the disks 15 and 17 in adjacent relation, as most clearly shown in Fig. 7. Attaching portions in the form of tapered prongs 19 extend outwardly from the inner edges of the disk 17 in a direction opposed to that taken by the prongs 16. The prongs 19 may be slightly longer than the prongs 16 for embedded engagement within the body 7 of the button 1. Thus it will be seen that my improved attaching means has a base 20 comprising the disks 15 and 17 as maintained in clamped engagement by the wall 18 of the member 14. The prongs 16 extend downwardly from the base, in the position of the part illustrated in the drawing, for fastener engagement with the fastener member 4 and the prongs 19 extend upwardly from the base to engage the button 1.

Assembly of the parts of my installation is carried out through moving the attaching means 6 toward the under surface 21 of the button 1 and by means of a suitable tool forcing the prongs 19 of the attaching means into the body 7 of the button so as to embed the prongs 19 in the button to secure the parts together. This action tends to force the base 20 against the under surface 21 of the button. Next the prongs 16 of the attaching means are projected through the supporting strip 3 and against the flange 11 of the socket member by which they are turned into the annular retainer wall 12. Thus the prongs 16 are securely engaged with the socket member 4 with the result that the strip 3 is clamped between the button and the socket member. Although I have chosen to illustrate my improved attaching means in combination with a resilient socket member, it will be understood that the attaching means is equally adaptable to use with a stud member, which may be of the type illustrated in United States Patent 2,131,347 to Fenton.

One of the advantages of my invention results from the particular construction of the attaching means enabling the attaching means to be assembled with a member having a solid body, after which the assembled parts may be shipped as a unit to a manufacturer so as to be quickly and easily assembled with a desired supporting strip together with either a stud or socket fastener member.

Although I have illustrated and described a preferred embodiment of my invention, I do not wish to be limited thereby because the scope of my invention is best defined by the following claims.

I claim:

1. A fastener assembly comprising an ornamental part such as a button, a fastener member having means for cooperative fastener engagement with another part and an annular retainer portion of U-shaped cross-sectional shape, and an attaching means securing said fastener member to said ornamental part, said attaching means having upwardly extending attaching portions in fastened engagement with said ornamental part and downwardly extending prong portions having their free ends secured within said retainer portion whereby said parts are assembled together.

2. A fastener assembly comprising an ornamental part such as a button having a solid body, a fastener member having means for cooperative fastener engagement with another part and an annular retainer portion of U-shaped cross-sectional shape, and an attaching means securing said fastener member to said ornamental part, said attaching means having upwardly extending prong portions in embedded engagement with said body of said ornamental part and downwardly extending prong portions having their free ends secured within said retainer portion whereby said parts are assembled together.

3. A fastener assembly comprising an ornamental part such as a button having a solid body portion of leather or the like, a fastener member having means for cooperative fastener engagement with another part, and an attaching means securing said fastener member to said ornamental part, said attaching means having tapered prong portions in embedded engagement with said body of said ornamental part and attaching portions in fastened engagement with said fastener member whereby said parts are assembled together.

4. A fastener assembly comprising an ornamental part such as a button, a fastener member having means for cooperative fastener engagement with another member and an attaching means securing said fastener member to said ornamental part, said attaching means having an annular base comprising a cup-shaped ring-retainer portion and a ring portion secured in assembly with said ring-retainer portion, attaching portions extending from said base, certain of said attaching portions being secured in engagement with said fastener member and certain of said attaching portions being in fastened engagement with said ornamental part.

5. A fastener assembly comprising an ornamental part such as a button, a fastener member having means for cooperative fastener engagement with another member and an attaching means securing said fastener member to said ornamental part, said attaching means having a pair of disk-like portions, means clamping said disk-like portions in adjacent relation, and attaching portions extending from said disk-like portions in opposed directions, certain of said attaching portions being secured in engagement with said fastener member and certain of said attaching portions being in fastened engagement with said ornamental part.

6. A fastener assembly comprising an ornamental part such as a button having a solid body portion, a fastener member having means for cooperative fastener engagement with another part and an annular retainer portion of substantially U-shaped cross-sectional shape, and an attaching means securing said fastener member to said ornamental part, said attaching means having a base comprising a cup-shaped ring-retainer portion and a ring portion clamped within said ring-retainer portion, prong portions integral with said ring-retainer portion extending downwardly from said base and prong portions integral with said ring portions extending upwardly from said base, said downwardly extending prong portions having their free ends secured within said retainer portion of said fastener member, and said upwardly extending prong portions having their free ends in embedded engagement with said body of said ornamental part.

GEORGE L. FOWLER.